United States Patent
Tange et al.

(10) Patent No.: US 10,730,155 B2
(45) Date of Patent: Aug. 4, 2020

(54) MACHINE TOOL WITH MANUAL PULSE GENERATOR

(71) Applicant: MAKINO MILLING MACHINE CO., LTD., Tokyo (JP)

(72) Inventors: Keisuke Tange, Aiko-gun (JP); Kazumasa Nakayasu, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 16/331,763

(22) PCT Filed: Sep. 9, 2016

(86) PCT No.: PCT/JP2016/076698
§ 371 (c)(1),
(2) Date: Mar. 8, 2019

(87) PCT Pub. No.: WO2018/047310
PCT Pub. Date: Mar. 15, 2018

(65) Prior Publication Data
US 2019/0232447 A1     Aug. 1, 2019

(51) Int. Cl.
*B23Q 3/157*     (2006.01)
*B23Q 11/08*     (2006.01)
(Continued)

(52) U.S. Cl.
CPC .............. *B23Q 3/157* (2013.01); *B23Q 3/155* (2013.01); *B23Q 3/15533* (2013.01); *B23Q 5/22* (2013.01); *B23Q 11/00* (2013.01); *B23Q 11/0085* (2013.01); *B23Q 11/08* (2013.01); *B23Q 11/0825* (2013.01); *B23Q 11/0891* (2013.01); *B23Q 15/013* (2013.01);
(Continued)

(58) Field of Classification Search
CPC ...... B23Q 3/155–3/15793; G05B 2219/50239; G05B 19/409
USPC ........................................................ 700/179
See application file for complete search history.

(56) References Cited

U.S. PATENT DOCUMENTS 3,755,790 A * 8/1973 Berger ................. G11B 27/105
360/49
5,247,295 A * 9/1993 Kanda .................. G05B 19/409
340/12.18
(Continued)

FOREIGN PATENT DOCUMENTS

CN    201685135 U  * 12/2010
CN    205703261 U  * 11/2016
(Continued)

*Primary Examiner* — Erica E Cadugan
(74) *Attorney, Agent, or Firm* — Morrison & Foerster LLP

(57) ABSTRACT

A machine tool, which has a tool magazine for storing multiple tools and is for machining a workpiece with a tool held on a main shaft by moving the main shaft relative to the workpiece, wherein the machine tool is provided with: multiple feed shafts for moving the tool relative to the workpiece; a tool magazine drive motor for driving the tool magazine; and a manual pulse generator, which is for sending a positive or negative command pulse to the multiple feed shafts or tool magazine drive motor, the manual pulse generator being provided with a selection switch for selecting one of the multiple feed shafts or the tool magazine drive motor as the destination to which the command pulse is to be sent.

5 Claims, 4 Drawing Sheets

(51) Int. Cl.
*B23Q 15/013* (2006.01)
*G05B 19/409* (2006.01)
*B23Q 5/22* (2006.01)
*B23Q 3/155* (2006.01)
*B23Q 11/00* (2006.01)

(52) U.S. Cl.
CPC ........ *G05B 19/409* (2013.01); *B23Q 3/15722* (2016.11); *B23Q 3/15766* (2013.01); *B23Q 2705/104* (2013.01); *G05B 2219/24122* (2013.01); *G05B 2219/34347* (2013.01); *G05B 2219/36383* (2013.01); *G05B 2219/36389* (2013.01); *G05B 2219/50272* (2013.01); *Y10T 483/11* (2015.01); *Y10T 483/115* (2015.01); *Y10T 483/12* (2015.01); *Y10T 483/1755* (2015.01); *Y10T 483/1882* (2015.01)

(56) References Cited

U.S. PATENT DOCUMENTS

| | | | | |
|---|---|---|---|---|
| 5,299,477 | A * | 4/1994 | Miyajima | B21D 28/12 483/28 |
| 5,493,193 | A * | 2/1996 | Seki | G05B 19/40932 318/573 |
| 5,742,140 | A * | 4/1998 | Yamada | G05B 19/404 318/560 |
| 6,471,451 | B2 * | 10/2002 | Kojima | G05B 19/404 318/471 |
| 7,343,660 | B1 * | 3/2008 | Lemelson | B23Q 41/06 29/563 |
| 7,899,574 | B2 * | 3/2011 | Ogawa | G05B 19/4069 700/159 |
| 8,212,692 | B2 * | 7/2012 | Yang | G05B 19/409 341/20 |
| 8,742,904 | B2 * | 6/2014 | Tsuchimochi | G08C 19/16 244/189 |
| 10,324,451 | B2 * | 6/2019 | Kawai | G05B 19/4063 |
| 2007/0168061 | A1 * | 7/2007 | Iefuji et al. | G05G 1/02 700/83 |
| 2008/0234855 | A1 * | 9/2008 | Haas | G05B 19/409 700/180 |
| 2017/0205803 | A1 * | 7/2017 | Okamoto | G08C 17/00 |
| 2018/0141180 | A1 * | 5/2018 | Okamura | G06F 3/0362 |
| 2018/0143614 | A1 * | 5/2018 | Aizawa | B23Q 1/0045 |
| 2018/0143615 | A1 * | 5/2018 | Aizawa | G05B 19/409 |
| 2019/0034025 | A1 * | 1/2019 | Izumi | G05B 19/042 |
| 2019/0163168 | A1 * | 5/2019 | Kitamura | G05B 19/414 |
| 2020/0033829 | A1 * | 1/2020 | Kitamura et al. | G05B 19/18 |

FOREIGN PATENT DOCUMENTS

| | | |
|---|---|---|
| EP | 0536412 A1 | 4/1993 |
| JP | 63-006606 A * | 1/1988 |
| JP | 11-305815 A * | 11/1999 |
| JP | 2003-80427 | 3/2003 |
| KR | 101315332 B1 * | 10/2013 |

* cited by examiner

MACHINE TOOL WITH MANUAL PULSE GENERATOR

CROSS-REFERENCE OF RELATED APPLICATIONS

This application is a U.S. national phase patent application of International Patent Application No. PCT/JP2016/076698, filed Sep. 9, 2016, which is hereby incorporated by reference in the present disclosure in its entirety.

FIELD OF THE INVENTION

The present invention relates to a machine tool having a tool magazine.

BACKGROUND OF THE INVENTION

In a machine tool having a tool magazine and tool changer, the operation for changing a tool between a spindle of the machine tool and the tool magazine is automatically performed by a command from a machining program. On the other hand, the preparatory work for a tool, that is, the operation of loading a tool into the tool magazine, is performed by an operator. The tool magazine is usually protected by being held in a housing, so when an operator loads a tool into the tool magazine, he opens the door of an opening part provided in the housing. To secure the safety of the operator, an interlock acts to prevent the tool magazine from operating when the door of the housing is opened and to prevent the door of the housing from being opened when the tool magazine is operating (for example, see PTL 1).

PATENT LITERATURE

[PTL 1] Japanese Unexamined Patent Publication No. 2003-80427

BRIEF SUMMARY OF THE INVENTION

When an operator, for example, tries to change a tool in a rotary type tool magazine, he uses a control panel of the machine tool to designate the number of a gripper of the tool magazine at which the tool to be changed is loaded and then press a button for moving the tool magazine. This being so, the tool magazine receives a command from the control device and turns until the mounting position. When the tool magazine finishes moving, the operator manually opens the door of the housing and changes the tool in the tool magazine, then closes the door to release the interlock. If there are a plurality of tools to be changed, the operator has to repeat the above-mentioned process for each of the tools. In other words, even if there are a plurality of tools to be changed, it was not possible to omit some of the processes or perform some all together. Therefore, greater efficiency in preparatory work of tools, particularly if the number of tools to be changed at one time is large, has been sought.

Further, in the past, machine tools have had an automated operation mode for sending commands to feed axes based on a machining program. Further, to send commands for movement of the feed axes in manual operation, there is a jog feed mode for sending commands for movement by a jog button and a handle feed mode for sending commands for movement by a manual pulse generator. These modes are exclusionary of each other. An operator selects any of the automated operation mode, jog feed mode, or handle feed mode for use. The work of the operator inserting a tool in a target gripper in the tool magazine chamber is, considering the efficiency of the work time, performed in parallel right in the middle of execution of a machining program of the automated operation mode at the machining chamber side to process a workpiece. For this reason, a separate switch is prepared so as to enable the tool magazine drive motor to rotate to a desired mounting position during the automated operation mode. To prevent the automated operation mode from being suspended and machining from stopping, the tool magazine drive motor is not allowed to be driven by a jog feed or handle feed command.

The present invention is made in consideration of the above situation and has as its object to provide a machine tool enabling preparatory work of a tool to be efficiently performed.

To achieve the above object, according to the present invention, there is provided a machine tool having a tool magazine holding a plurality of tools, moving a spindle and workpiece relative to each other, and machining a workpiece by a tool held by the spindle, which machine tool comprises a plurality of feed axes for moving the tool and the workpiece relative to each other, a tool magazine drive motor for driving the tool magazine, and a manual pulse generator for sending positive or negative command pulses to the plurality of feed axes or the tool magazine drive motor, the manual pulse generator comprising a selection switch for selecting one of the tool magazine drive motor and the plurality of feed axes as a destination of the command pulses.

According to the present invention, it is possible to manually turn the tool magazine for indexing. As a result, even when there are a plurality of tools to be changed, the operator can continuously perform the indexing of the tool magazine and changing of a plurality of tools a plurality of times without repeatedly opening and closing the tool magazine chamber door and therefore can perform the preparatory work for tools efficiently.

DETAILED DESCRIPTION OF THE INVENTION

Figure 1:
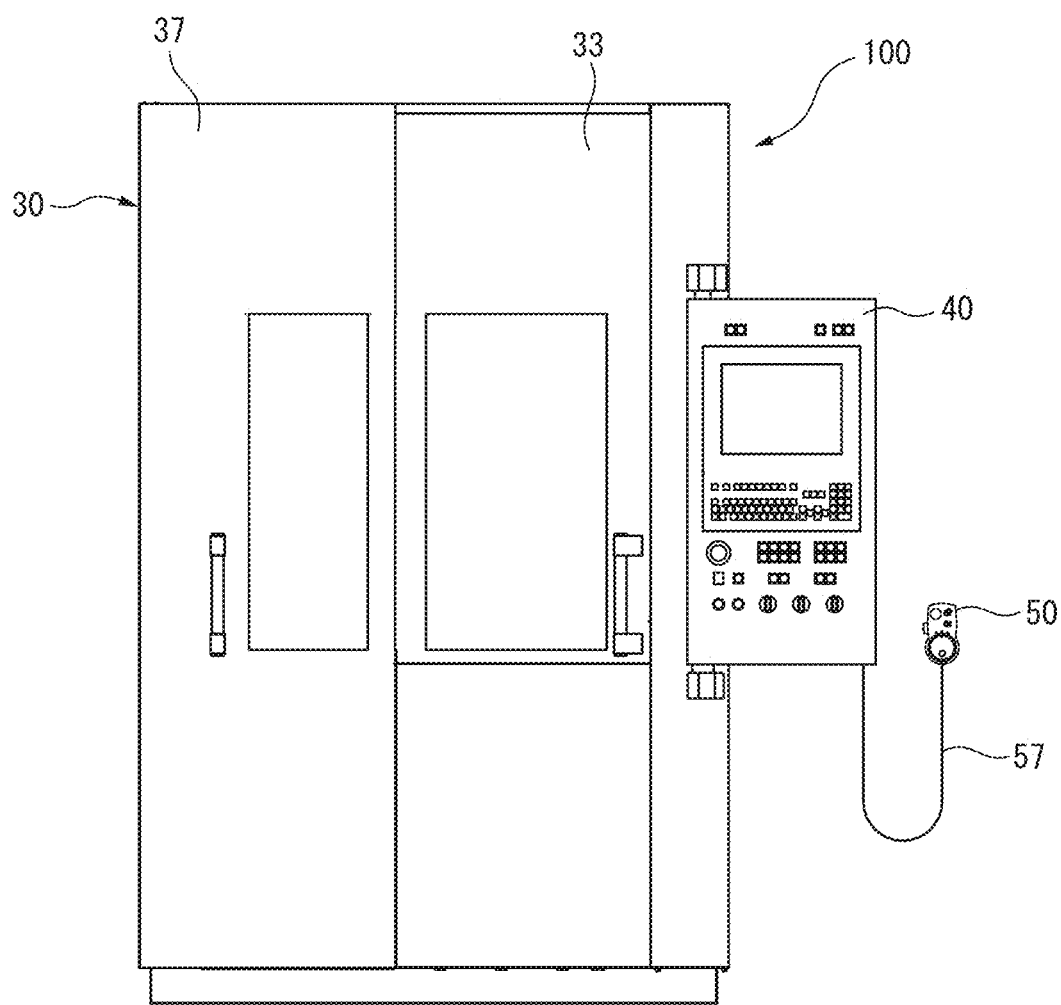
FIG. 1 is a front view of a machine tool according to an embodiment of the present invention.
Figure 2:
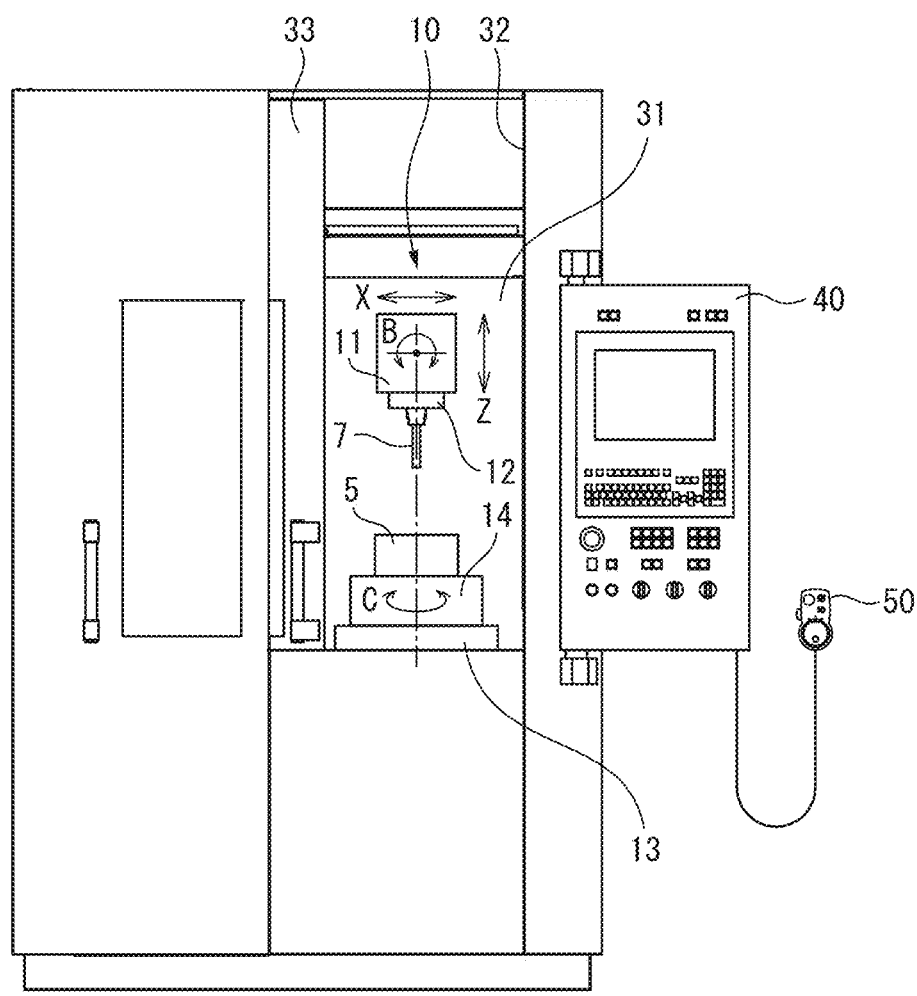
FIG. 2 is a front view of a state of opening a machining chamber door of the machine tool.

Below, referring to FIG. 1 to FIG. 4, a machine tool 100 according to an embodiment of the present invention will be explained.

The machine tool 100 in the present embodiment is configured as a five-axis control vertical machining center which moves a spindle 12 and a workpiece 5 relative to each other and uses a tool 7 fastened to the spindle 12 to machine the workpiece 5. The machine tool 100 comprises a machine tool body 10, a control device (not shown), a rotary type tool magazine 20, a tool changer (not shown), a housing 30 holding the same, a control panel 40 attached to the right end part of the housing 30 to be able to pivot and including at least part of the constitution of the control device, and a manual pulse generator 50 connected to the control panel 40 by a cable 57.

The machine tool body 10 has a not shown bed and column in addition to a spindle head 11 holding the spindle 12, a table 13, and a rotary table 14. The machine tool body 10 has the three axes of the X-axis, the Y-axis (not shown), and the Z-axis as linear feed axes and the B-axis and C-axis respectively as rotary feed axes about the Y-axis and about the Z-axis. Note that, the linear feed axes and rotary feed axes except for the Y-axis are shown conceptually in FIG. 2. The machine tool body 10, while not shown, is provided with movement devices for the respective axes, that is, an X-axis movement device, Y-axis movement device, Z-axis movement device, B-axis movement device, and C-axis movement device. These movement devices are provided with respective drive motors (not shown). The drive motors are usually controlled by a control device. In the machine tool body 10 of the present embodiment, the X-axis movement device drives the column, the Y-axis movement device drives the table 13, the Z-axis movement device and the B-axis movement device drive the spindle head 11, and the C-axis movement device drives the rotary table 14.

The housing 30 is formed into a substantially box shape. It has a partition wall (not shown) dividing the inside of the housing 30 into a region in which the machining part is provided and a region in which the tool magazine 20 is provided. As a result, the housing 30 is formed with a machining chamber 31 and a tool magazine chamber 35. The housing 30 has a machining chamber opening part 32 partially opening the front surface side of the machining chamber 31 and a sliding type machining chamber door 33 opening and closing that machining chamber opening part 32. The housing 30 also has a tool magazine chamber opening part 36 fully opening the front surface side of the tool magazine chamber 35 and a sliding type tool magazine chamber door 37 opening and closing that tool magazine chamber opening part 36. The machining chamber door 33 and tool magazine chamber door 37 are normally closed during machining.

The tool magazine 20 is provided with a rotary member (not shown) at which a plurality of grippers 21 for gripping tools 7 are arranged in a ring and a tool magazine drive motor 22 driving rotation of the rotary member about the Z-axis direction rotational axis Az. The tool magazine 20 is set with a tool transfer position (not shown) with a tool changer and a tool mounting position Pm for the operator. By controlling the tool magazine drive motor 22, it is possible to set a specific gripper 21 and tool 7 at the tool transfer position or tool mounting position Pm, that is, possible to perform indexing. Note that, the tool mounting position Pm is arranged at the front side of the inside of the tool magazine chamber 35 so that the operator can easily access it. Further, the tool magazine 20 can not only be operated automatically, but also, in the present embodiment, can be operated manually using the manual pulse generator 50.

The tool magazine 20 in the above embodiment is one which moves the grippers 21 along a circular orbiting path, but an embodiment of a type where the tool magazine 20 moves the gripper 21 along a noncircular orbit path is also possible.

The manual pulse generator 50 is adapted to manually drive a tool magazine drive motor 22 and drive motors (not shown) of the X-axis, Y-axis, Z-axis, B-axis, and C-axis movement devices (not shown), which are normally driven based on commands from a control device, as required by sending out command pulses. For this reason, the manual pulse generator 50 is configured to be able to send out command pulses and has a pulse generation operating means comprised of a pulse generation dial 51 provided with graduations over its entire circumference, a selection switch 52 for selecting a destination of command pulses, a multiplier selection switch 53, an emergency stop button 54, an electronic circuit board (not shown), and further, in the present embodiment, an enable switch 55, a case 56 for enclosing the electronic circuit board and attaching thereto the switches and of a size enabling it to be held by one hand, and a cable 57 for electrical connection to the control panel 40.

The selection switch 52 has a function of turning power of the manual pulse generator 50 ON and OFF and a function of selecting the axis of destination of the command pulses. The indications of "X, Y, Z, B, C" around the dial of the selection switch 52 of FIG. 4 respectively correspond to the X-axis, Y-axis, Z-axis, B-axis, and C-axis while "T" corresponds to the tool magazine 20. Therefore, for example, if "X" is selected, the command pulses are sent to the X-axis drive motor of the X-axis movement device, while if "T" is selected, the command pulses are sent to the tool magazine drive motor 22.

The pulse generation dial 51 is configured to manually control the distance of movement of the feed axis etc., the direction of movement of the feed axis etc., and the speed of movement of the feed axis etc. The distance of movement of the feed axis etc. is determined by setting a number of pulses corresponding to the graduations around the dial. When the multiplier selection switch 53 selects "×1", if moving the pulse generation dial 51 by one graduation, one pulse is generated. If the multiplier selection switch 53 selects "×10", "×100", or "×1000", the number of pulses of 10×, 100×, or 1000× the number when "×1" is selected are generated. If the drive motor of the feed axis etc. selected by the selection switch 52 receives command pulses, it rotates by exactly a predetermined angle corresponding to the number of pulses.

Regarding the direction of movement of the feed axis etc., the positive or negative orientations determined at the feed axes etc. are determined by turning the pulse generation dial 51 clockwise or turning it counterclockwise.

The speed of movement of the feed axis etc. is determined according to the rotational speed of the pulse generation dial 51. However, if the selection switch 52 selects "T", that is, the tool magazine drive motor 22, the peripheral speed of the tool magazine 20 is limited to 2 m/min or less. Note that, the peripheral speed of 2 m/min or less is a sufficiently slow speed enabling an operator to perform work safely even if making the tool magazine 20 rotate in the state with the tool magazine chamber door 37 open.

The enable switch 55 is formed as a pushbutton switch. The operation of the pulse generation dial 51 is enabled and transmission of pulses is allowed only while the enable switch 55 is being pressed. Therefore, when desiring to send out command pulses, the operator has to press the enable switch 55 while operating the pulse generation dial 51.

The manual pulse generator 50 in the present embodiment is designed to a form suitable for an operator to hold it by the left hand and push the enable switch 55 by the thumb of the left hand while turning the pulse generation dial 51 by the right hand. Holding the pulse generator 50 by the right hand and pushing the enable switch 55 by the ring finger etc. of the right hand while turning the pulse generation dial 51 by the left hand might sometimes be possible. However, in the present embodiment, the enable switch 55 and the pulse generation dial 51 are arranged on the case 56 of the manual pulse generator 50 so that simultaneous operation of these by one hand is impossible.

Next, an example of a manual operation procedure for manually operating the tool magazine 20 using the manual pulse generator 50 so as to change a tool 7 of the tool magazine 20 will be explained.

First, the operator changes the selection switch 52 of the manual pulse generator 50 from "OFF" to "T" to select the tool magazine drive motor 22. Due to this, the control device recognizes the start of manual control of the tool magazine drive motor 22. Next, the operator opens the tool magazine chamber door 37. Next, the operator holds the manual pulse generator 50 in his hand, stands in front of the tool magazine chamber 35, checks the position of the gripper 21 gripping the tool 7 to be changed (below, referred to as the "target gripper 21"), and determines the rotation direction of the tool magazine 20. Next, the operator makes the target gripper 21 move to the mounting position Pm by using a finger of his left hand to press the enable switch 55 while using a finger of his right hand to turn the pulse generation dial 51 to the right or left to the anticipated graduation. This being so, the tool magazine drive motor 22 rotates in the designated direction in accordance with the number of command pulses from the manual pulse generator 50. If the target gripper 21 fails to reach the mounting position Pm at the anticipated graduation, that is, number of pulses, the pulse generation dial 51 may be further turned. Conversely, if the target gripper 21 passes the mounting position Pm, the pulse generation dial 51 may be turned back. Further, when the target gripper 21 is positioned at the mounting position Pm, the operator changes the tool 7 which had been held there with the replacement tool 7 prepared in advance.

Figure 3:
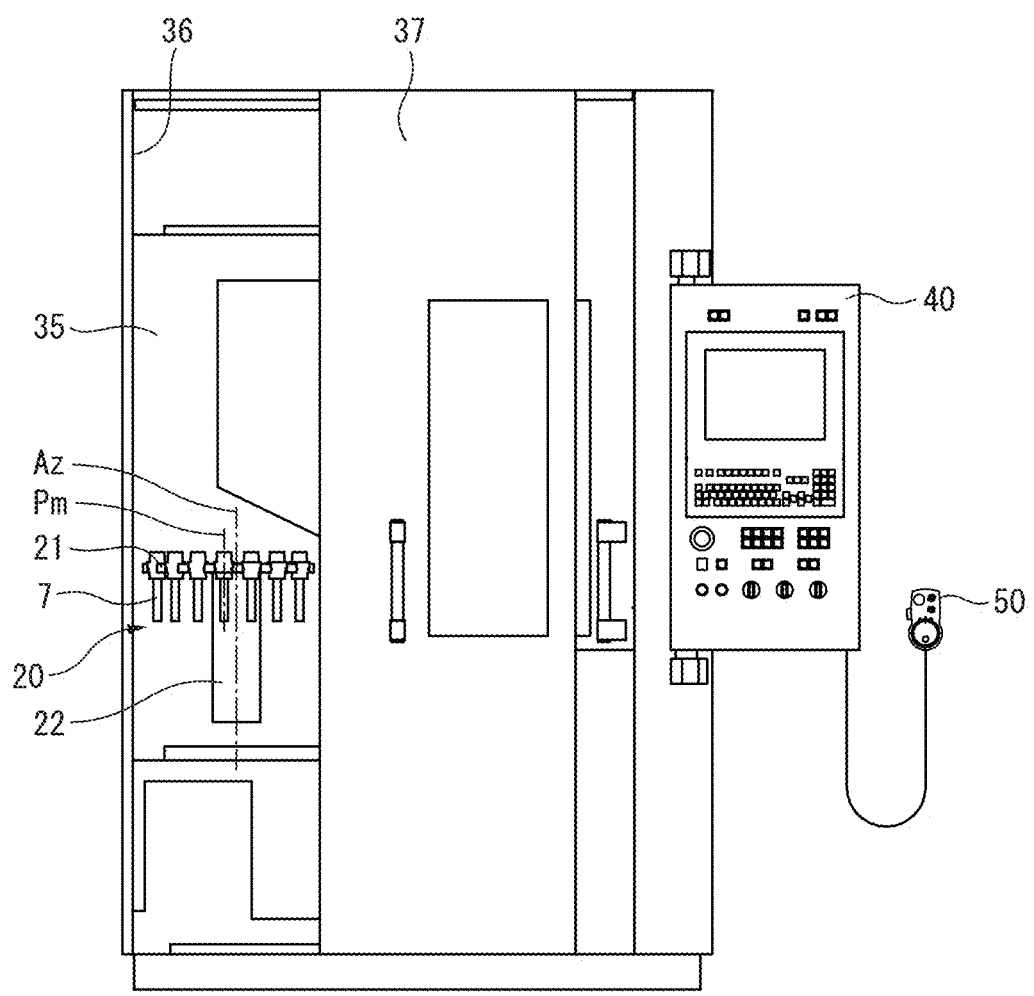
FIG. 3 is a front view of a state of opening of a tool magazine chamber door of the machine tool.
Figure 4:
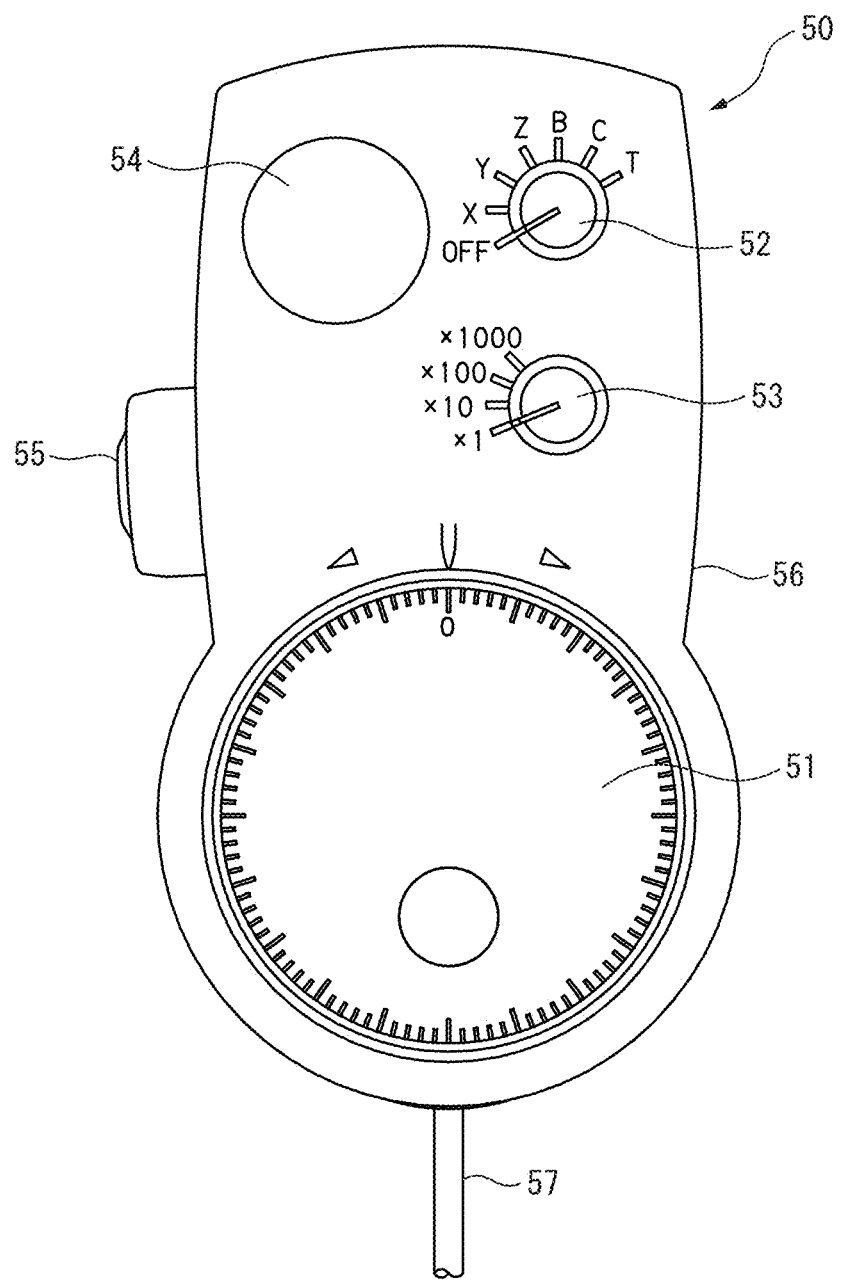
FIG. 4 is a front view of a manual pulse generator of the machine tool according to the embodiment of the present invention.

Note that, in the machine tool of the present embodiment, as shown in FIG. 3, the tool magazine chamber door 37 is opened wide. For this reason, the range of the mounting position Pm is wide. When the operator moves the target gripper 21 to the mounting position Pm by the manual pulse generator 50, no fine positioning operation is required. If the operator makes the target gripper 21 move to the front of the operator by his eye, the target gripper can be positioned at the mounting position Pm and the operator can easily change the tool 7.

If there are a plurality of the tools 7 to be changed, it is sufficient to repeat the above process from the process of confirming the position of the next target gripper 21 while leaving the tool magazine chamber door 37 open. Further, the operation of changing tools 7 ends by closing the tool magazine chamber door 37 and returning the selection switch 52 of the manual pulse generator 50 to OFF at the stage of finishing changing the last tool 7.

In the machine tool in the present embodiment, the tool magazine chamber door 37 opens wide, so the operator can approach a plurality of tools 7 adjoining each other without changing the indexing position of the tool magazine drive motor 22. For this reason, if the plurality of tools 7 to be changed are adjoining tools, if making the tool magazine drive motor 22 turn one time to move the position of the target gripper 21 to the mounting position Pm, it is possible to simultaneously change a plurality of tools 7 adjoining each other.

The procedure for manual operation of the tool magazine 20 can be performed even when the machine tool 100 is performing machining by automated operation based on commands from the machining program. However, if a tool changing command is issued from the control device based on the machining program during manual operation of the tool magazine 20, in the present embodiment, the tool changing command is not allowed to be performed until selection of the tool magazine drive motor 22 by the selection switch 52 of the manual pulse generator 50 is cancelled or until the tool magazine chamber door 37 is closed.

If a next tool changing command is scheduled by the machining program being executed, a reset operation is performed regardless of the tool changing command not yet being reached. In the reset operation, the control device confirms that the tool changing work by the operator has ended when the operator closes the tool magazine chamber door 37 and the selection switch 52 of the manual pulse generator 50 is made other than "T" and drives the tool magazine drive motor 22 so as to index the tool 7 called up as the tool to be next changed in the machining program by automated operation to the next tool standby position. The "next tool standby position" is the position for standby enabling an operation of returning a tool being used at the spindle 12 and an operation of gripping the tool 7 to be used next at the spindle to be quickly and efficiently performed when reaching a tool changing command in a machining program being executed.

As has been well known in the past, a manual pulse generator 50 is used for manual control of the feed axes of a machine tool body 10. As opposed to this, in the present embodiment, the manual pulse generator 50 is also used for indexing the rotary type tool magazine 20. Due to this, even if there are a plurality of tools 7 to be changed, the operator can continuously perform the indexing of the plurality of target grippers 21 and the changing of the plurality of tools 7 without repeatedly opening and closing the tool magazine chamber door 37.

Further, in the present embodiment, to secure the safety of the operator, the manual pulse generator 50 is provided with an enable switch 55. Due to the effect of the enable switch 55, the operator has to operate the manual pulse generator 50 by two hands, so during manual operation of the tool magazine 20, for example, it is difficult for the operator to insert one hand into the tool magazine chamber 35. Furthermore, in the present embodiment, even if, during manual operation of the tool magazine 20, for example, the hand of a person other than the operator is inserted into the tool magazine chamber 35, the peripheral speed during manual operation of the tool magazine 20 is limited to 2 m/min or less, so there is no problem in safety.

The fact that the advantageous effect by the above-mentioned embodiment is obtained by making small improvements to a conventionally used existing manual pulse generator 50 should be specially mentioned. The "small improvements" are giving the selection switch 52 a function of selecting the tool magazine 20 and providing an enable switch 55.

REFERENCE SIGNS LIST 7 tool
10 machine tool body
12 spindle
20 tool magazine
21 gripper
22 tool magazine drive motor
30 housing
33 machining chamber door
37 tool magazine chamber door
40 control panel
50 manual pulse generator
51 pulse generation dial
52 selection switch
55 enable switch

The invention claimed is:

1. A machine tool having a tool magazine holding a plurality of tools, moving a spindle and workpiece relative to each other, and machining the workpiece by a tool held by the spindle, the machine tool comprising:
   a plurality of feed axes for moving the tool and the workpiece relative to each other;
   a tool magazine drive motor for driving the tool magazine; and
   a manual pulse generator for sending positive or negative command pulses to the plurality of feed axes or the tool magazine drive motor, the manual pulse generator comprising a selection switch for selecting one of the tool magazine drive motor and the plurality of feed axes as a destination of the command pulses.

2. The machine tool according to claim 1 wherein
   the manual pulse generator has a pulse generation operating means and an enable switch,
   operation of the pulse generation operating means is enabled and transmission of pulses is allowed only while the enable switch is being operated, and
   the enable switch and the pulse generation operating means are arranged at the manual pulse generator so that two hands have to be used for simultaneously operating both of the enable switch and the pulse generation operating means.

3. The machine tool of claim 1 wherein if the tool magazine drive motor is selected by the selection switch provided at the manual pulse generator right in the middle of the machine tool performing machining by automated operation based on commands from a machining program, the machining is continued while transmission of the command pulses to the tool magazine drive motor from the manual pulse generator is allowed.

4. The machine tool of claim 1 wherein when the selection switch of the manual pulse generator selects the tool magazine drive motor, even if a tool changing command has been issued from the machining program, execution of the tool changing command is not allowed until selection of the tool magazine drive motor is cancelled.

5. The machine tool of claim 1 wherein
   a housing of the machine tool forms a tool magazine chamber holding the tool magazine and an opening part enabling an operator to access the tool magazine chamber and comprises a tool magazine chamber door opening and closing the opening part, and
   even when the tool magazine chamber door is opened, operation of the tool magazine drive motor based on a command from the manual pulse generator is allowed.

\* \* \* \* \*